(12) United States Patent
Reneker et al.

(10) Patent No.: US 9,476,145 B2
(45) Date of Patent: Oct. 25, 2016

(54) FLEXIBLE CERAMIC FIBERS AND A PROCESS FOR MAKING SAME

(75) Inventors: Darrell Reneker, Akron, OH (US); George Chase, Wadsworth, OH (US); Woraphon Kataphinan, Akron, OH (US); Prathyusha Katta, Oxnard, CA (US)

(73) Assignee: The University of Akron, Akron, OH (US)

( * ) Notice: Subject to any disclaimer, the term of this patent is extended or adjusted under 35 U.S.C. 154(b) by 1015 days.

(21) Appl. No.: 12/063,266

(22) PCT Filed: Sep. 7, 2006

(86) PCT No.: PCT/US2006/034946
§ 371 (c)(1),
(2), (4) Date: May 5, 2008

(87) PCT Pub. No.: WO2007/030669
PCT Pub. Date: Mar. 15, 2007

(65) Prior Publication Data
US 2008/0242178 A1    Oct. 2, 2008

Related U.S. Application Data

(60) Provisional application No. 60/715,004, filed on Sep. 7, 2005.

(51) Int. Cl.
*D01D 5/00* (2006.01)
*C04B 35/622* (2006.01)
*C04B 35/634* (2006.01)

(52) U.S. Cl.
CPC .......... *D01D 5/003* (2013.01); *C04B 35/6224* (2013.01); *C04B 35/6225* (2013.01);

(Continued)

(58) Field of Classification Search
USPC ........................................................ 264/623
See application file for complete search history.

(56) References Cited

U.S. PATENT DOCUMENTS 4,446,579 A    5/1984    Inamori et al.
4,707,399 A    11/1987   Rambosek (Continued)

FOREIGN PATENT DOCUMENTS

EP    0 172 008    9/1985
JP    2002155608   5/2002

OTHER PUBLICATIONS

D Li et al, "Fabrication of Titania Nanofibers by Electrospinning" Nano Letter, vol. 3, pp. 555-560 (2003), pp. 555-557.

(Continued)

*Primary Examiner* — Angela Ortiz
*Assistant Examiner* — Russell Kemmerle, III
(74) *Attorney, Agent, or Firm* — Renner Kenner Greive Bobak Taylor & Weber

(57) ABSTRACT

The present invention is generally directed to flexible ceramic fibers and to methods for making same. In one embodiment, the present invention relates to flexible ceramic fibers that are heat and chemical resistant, and to a method for making same. In another embodiment, the present invention relates to flexible ceramic nanofibers, and to a method for making same. In still another embodiment, the present invention relates to electrospun flexible ceramic nanofibers, products that include such fibers, and to methods of making same.

10 Claims, 11 Drawing Sheets

(52) U.S. Cl.
CPC ... *C04B35/62231* (2013.01); *C04B 35/62236* (2013.01); *C04B 35/62245* (2013.01); *C04B 35/62259* (2013.01); *C04B 35/62263* (2013.01); *C04B 35/63444* (2013.01); *C04B 2235/526* (2013.01); *C04B 2235/5252* (2013.01); *C04B 2235/5264* (2013.01); *C04B 2235/6562* (2013.01); *Y10T 428/2913* (2015.01); *Y10T 442/681* (2015.04)

(56) References Cited

U.S. PATENT DOCUMENTS

| | | | | |
|---|---|---|---|---|
| 5,279,780 | A | * | 1/1994 | Lipowitz et al. ............... 264/82 |
| 5,380,580 | A | | 1/1995 | Rogers et al. |
| 5,400,832 | A | | 3/1995 | Kitamura |
| 5,451,448 | A | | 9/1995 | Sawko et al. |
| 5,455,106 | A | | 10/1995 | Steffier |
| 5,480,707 | A | | 1/1996 | Steffier |
| 5,558,932 | A | | 9/1996 | Scanlon |
| 5,573,718 | A | | 11/1996 | Shih et al. |
| 5,658,650 | A | | 8/1997 | Neamy et al. |
| 5,744,252 | A | | 4/1998 | Rasky et al. |
| 6,228,786 | B1 | | 5/2001 | Olry et al. |
| 6,382,526 | B1 | | 5/2002 | Reneker et al. |
| 6,520,425 | B1 | | 2/2003 | Reneker |
| 6,695,992 | B2 | | 2/2004 | Reneker |
| 2004/0126624 | A1 | * | 7/2004 | Akbar et al. .................. 428/701 |
| 2007/0018361 | A1 | | 1/2007 | Xu |
| 2008/0160856 | A1 | * | 7/2008 | Chen et al. ................... 442/341 |

OTHER PUBLICATIONS

"Multi-Scale Modeling, Simulations and Experiments of Coating Growth on Nanofibers: Part II—Deposition," A. Buldum, C.B. Clemons, L.H. Dill, K.L. Kreider, G.W. Young, X. Zheng, E.A. Evans, G. Zhang, and S.I. Hariharan, accepted by Journal of Applied Physics, (2005).

"Multi-Scale Modeling, Simulations and Experiments of Coating Growth on Nanofibers: Part 1—Sputtering," A. Buldum, I Busuladzic, C.B. Clemons, L.H. Dill, K.L. Kreider, G.W. Young, E.A. Evans, G. Zhang, S.I. Hariharan, and W. Keifer, acepted by Journal of Applied Physics, (2005).

"Field Emission From Coated Nanowires," T. Marinov, A. Buldum, C.B. Clemons, K.L. Kreider, G.W. Young, and S.I. Hariharan, accepted by Journal of Applied Physics, (2005).

"Erbia-modified electrospun titania nanofibers for selective infrared emitters," R.T. Mensah, V. Tomer, W. Kataphinan, J.C. Tokash, N. Stojilovic, G.G. Chase, E.A. Evans, R.D. Ramsier, D.J. Smith, and D.H. Reneker, J. Phys Cond Mater, 16, 7557-7564, 2004.

Continuous Electrospinning of Aligned Polymer Nanofibers onto a Wire Drum Collector, P. Katta, M. Alessandro, R.D. Ramsier, and G.G. Chase, Nano Letters, 4(11), 2215-2218, 2004.

P. Katta and G.G. Chase, "Titania Nanofiber Enhanced Filter Media for Hot Gas Filtration," FILTECH 2005 International Conference, Wiesbaden, Germany, Oct. 2005.

* cited by examiner

US 9,476,145 B2

FLEXIBLE CERAMIC FIBERS AND A PROCESS FOR MAKING SAME

FIELD OF THE INVENTION

The present invention is generally directed to ceramic fibers and sheets or fabrics employing the fibers, and to methods for making same. In one embodiment, the present invention relates to ceramic fibers and sheets or fabrics employing the fibers, that are heat and chemical resistant, that and to a method for making same. In another embodiment, the present invention relates to ceramic nanofibers and sheets or fabrics employing the fibers, and to a method for making same. In still another embodiment, the present invention relates to electrospun ceramic nanofibers, products that include such fibers, and to methods of making same.

BACKGROUND OF THE INVENTION

Generally, ceramic fibers, and structures containing such fibers, are formed by a sol-gel process ceramic. In such a process, a sol-gel composition is coated and/or deposited onto the surface of, for example, an organic polymer fibers, and then the resulting combination is subjected to oxidation to yield a ceramic fiber. In more detail, a coated fiber is heated in air to cause the sol-gel composition to chemically react, and to oxidize the underlying polymer support, thereby essentially removing the polymer support material from the fiber (except for trace amounts of carbon). However, fibers created by such a process tend to suffer a number of drawbacks. For example, such fibers tend to be brittle, thus limiting their usefulness. Accordingly, there is a need in the art for flexible ceramic fibers, and for a process for making such fibers.

SUMMARY OF THE INVENTION

The present invention is generally directed to ceramic fibers, sheets and fabrics employing the fibers, and to methods for making same. In one embodiment, the present invention relates to ceramic fibers, sheets and fabrics that are heat and chemical resistant, and to a method for making same. In another embodiment, the present invention relates to ceramic nanofibers, sheets and fabrics and to a method for making same. In still another embodiment, the present invention relates to electrospun ceramic nanofibers, sheets and fabrics, and products that include such fibers, and to methods of making same.

In one embodiment, the present invention relates to a process for making a flexible ceramic composition comprising the steps of: (A) mixing at least one sol gel ceramic component, or precursor thereof, with at least one electrospinnable polymer thereby forming an electrospinnable solution; (B) electrospinning the solution into fibers; and (C) subjecting the fibers to a gradual heating process in a suitable atmosphere so that most and/or all of the carbonaceous component in the fibers oxidizes thereby yielding flexible ceramic fibers.

In another embodiment, the present invention relates to a process for making a flexible ceramic composition comprising the steps of: (i) mixing at least one sol gel ceramic component, or precursor thereof, with at least one electrospinnable polymer thereby forming an electrospinnable solution; (ii) aging the electrospinnable solution for a period of at least 14 days; (iii) electrospinning the solution into fibers; and (iv) subjecting the fibers to a heating process in a suitable atmosphere so that most and/or all of the carbonaceous component in the fibers oxidizes thereby yielding flexible ceramic fibers.

In still another embodiment, the present invention relates to flexible ceramic fibers produced by one of the foregoing processes.

BRIEF DESCRIPTION OF THE DRAWINGS

FIG. 8 is a schematic representation of one embodiment of an apparatus that can be used to produce ceramic nanofibers in accordance with the present invention, wherein the apparatus includes an outer gas shroud, and the shroud is modified with a partition;

DETAILED DESCRIPTION OF THE INVENTION

Figure 1A:
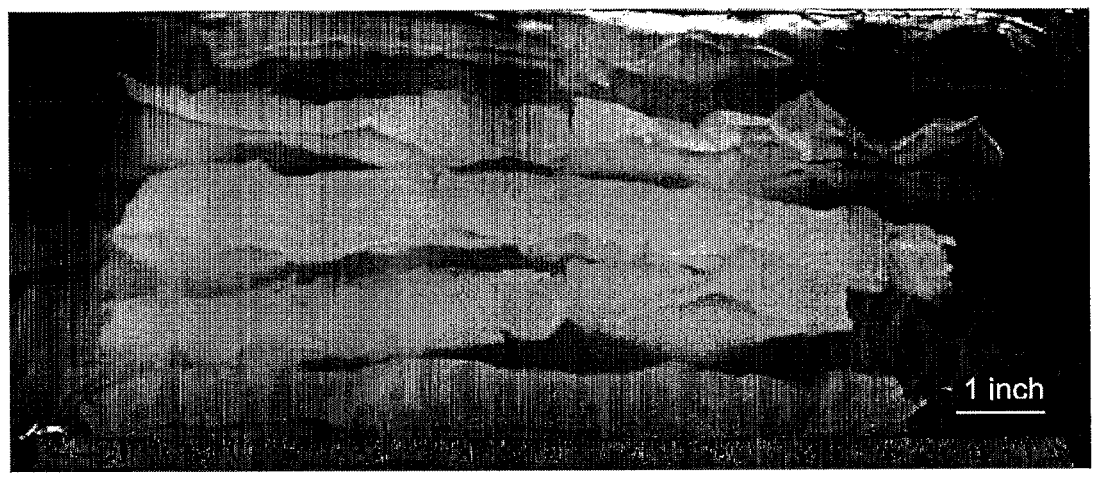
FIG. 1(A) is a photograph of titanium dioxide nanofibers sheets, formed in accordance with one embodiment of the present invention, after having been heated to 700° C.

The present invention is generally directed to flexible ceramic fibers and to methods for making same. In one embodiment, the present invention relates to flexible ceramic fibers that are heat and chemical resistant, and to a method for making same. In another embodiment, the present invention relates to flexible ceramic nanofibers, and to a method for making same. In still another embodiment, the present invention relates to electrospun flexible ceramic nanofibers, products that include such fibers, and to methods of making same.

The ceramic fibers of the present invention are considered to be flexible given the fact that they have some flexibility. But, when the fibers are employed together as a nonwoven fabric or sheet, then that sheet will have some flexibility. The fabric or sheet will have a flexibility somewhere in between that of tissue paper and computer paper as established via an ASTM D1338 standard test. Therefore, the ceramic fibers of the present invention will be described as flexible ceramic fibers in view of their flexibility, but especially in view of the flexibility achieved when they are employed in a fabric or sheet such as a nonwoven fabric.

As used herein nanofibers are fibers having an average diameter in the range of about 0.1 nanometer to about 25,000 nanometers (25 microns). In another embodiment, the nanofibers of the present invention are fibers having an average diameter in the range of about 1 to about 25,000 (25 microns), or about 1 nanometer to about 10,000 nanometers, or about 1 nanometer to about 5,000 nanometers, or about 3 nanometers to about 3,000 nanometers, or about 7 nanometers to about 1,000 nanometers, or even about 10 nanometers to about 500 nanometers. In another embodiment, the nanofibers of the present invention are fibers having an average diameter of less than 25,000 nanometers, or less than 10,000 nanometers, or even less than 5,000 nanometers. In still another embodiment, the nanofibers of the present invention are fibers having an average diameter of less than 3,000 nanometers, or less than about 1,000 nanometers, or even less than about 500 nanometers. Additionally, it should be noted that here, as well as elsewhere in the text, individual range limits may be combined.

The length of the nanofibers used in the present invention is not critical and any length nanofiber can be used in the present invention. In one embodiment, the nanofibers used in the present invention are at least about 0.5 meters in length, or at least about 1 meter in length, or at least about 5 meters in length, or at least about 10 meters in length, or at least about 25 meters in length, or at least about 50 meters in length, or at least about 100 meters in length, or at least about 250 meters in length, or at least about 500 meters in length, or at least about 1 kilometer in length, or at least about 3 kilometers in length, or at least about 5 kilometer in length, or even at least about 10 kilometer in length.

The fibers/nanofibers of the present invention can be fabricated according to a variety of methods known in the art including, but not limited to, electrospinning, wet spinning, dry spinning, melt spinning, and gel spinning. Electrospinning is particularly suitable for fabricating fibers of the present invention inasmuch as it tends to produce the thinnest (i.e., finest denier) fibers of any of the foregoing methods. Typically electrospun fibers can be produced having very small diameters, usually on the order of about 3 nanometers to about 3000 nanometers. In another embodiment, electrospun fibers can be produced on order of about 10 nanometers to about 1,000 nanometers, or from about 10 nanometers to about 750 nanometers, or from about 10 nanometers to about 500 nanometers, or from about 10 nanometers to about 250 nanometers, or even on the order of about 10 nanometers to about 100 nanometers.

Another particularly effective method for producing ceramic nanofibers in accordance with the present invention comprises the nanofibers by gas jet method (i.e., NGJ method). This method has been previously described and is known in the art. Briefly, the method comprises using a device having an inner tube and a coaxial outer tube with a sidearm. The inner tube is recessed from the edge of the outer tube thus creating a thin film-forming region. A suitable sol-gel composition can be fed in through the sidearm and fills the empty space between the inner tube and the outer tube. The polymer melt continues to flow toward the effluent end of the inner tube until it contacts the effluent gas jet. The gas jet impinging on the melt surface creates a thin film of the sol-gel solution, which travels to the effluent end of tube where it is ejected forming a turbulent cloud of ceramic nanofibers.

Electrospinning and NGJ techniques permit the processing of suitable sol-gel compositions from both organic and aqueous solvents. Exemplary patents that disclose NGJ methods include U.S. Pat. Nos. 6,695,992; 6,520,425; and 6,382,526, all of which are incorporated by reference in their entireties. A suitable electrospinning process for producing nanofibers/fibers is disclosed in, for example, U.S. Pat. No. 6,753,454, which is hereby incorporated by reference for its teachings related to electrospinning of fibers/nanofibers.

As used herein, the term "ceramic component" includes chemical compositions comprising metal oxides. Ceramics within the scope of the present invention include, but are not limited to, titania, silica, magnesia, zirconia, yttria, alumina, India, zinc oxide, zeolites, natural clays, synthetic clays and any combination thereof. Ceramics within the scope of the present invention also include such metal oxides in addition to an amount of dopant or additive for modifying its chemical, mechanical, thermal, electrical or other properties. Furthermore, the ceramic component can be in the form of a free standing monolithic structure, particles, nanoparticles, microparticles, granularized, pelletized, or otherwise shaped or formed.

As used herein, the term "ceramic precursor" includes any non-ceramic chemical compound that forms a ceramic upon reaction with itself or one or more additional compounds. Ceramic precursors within the scope of the present invention include, but are not limited to, metal alkoxides and metal salts such as metal halides, metal sulfates, metal phosphates, metal nitrates and any combination thereof.

The term "ceramic fiber", as used herein, includes fibers comprising metal oxides. Such fibers can contain carbon, as well. Furthermore, the carbon content can be a trace amount. In another embodiment, more than a trace amount of carbon can be present.

In one embodiment, ceramic fibers formed in accordance with the present invention result from the following method. A metal-organic solution is formed by mixing at least one sol-gel ceramic composition, or precursor thereof, with at least one electrospinnable polymer, thus forming an electrospinnable solution. Electrospinning such a solution results in a metal-organic fiber, referred to herein as a composite fiber. Composite fibers can then be fired in air by slowly increasing the temperature to a temperature that causes one or more carbonaceous component(s) present to undergo oxidation, thus leaving behind mainly and/or only the ceramic component of the fiber. Ceramic fibers obtained in this manner are generally more flexible than ceramic fibers made by previously know sol-gel processes. Accordingly, ceramic fibers formed in accordance with the present invention can withstand greater shear forces than fibers formed by prior art methods. As is noted above, the degree to which the carbonaceous component is removed can vary substantially. Thus the amount of carbon remaining in ceramic fibers formed in accordance with the present invention can be anywhere from trace to substantial amounts.

In one embodiment, the fibers of the present invention are electrospun onto a support sheet. Initially, it should be noted that the nature of the support sheet, if used in conjunction with the present invention, is not limited to any one structure. For example, suitable support sheets include, but are not limited to, fiber-based support sheets, polymer fiber-based support sheets, polymer film-based support sheets, metal foil support sheets, paper-based support sheets, or inorganic support sheets. In another embodiment, any support sheet that is used in connection with the present invention is formed from a composition that can survive the heating process that generates the ceramic fibers of the present invention. Depending upon the temperature used to produce the flexible ceramic fibers of the present invention the nature of the composition used to form a support sheet can vary, and therefore a wide variety of materials can be used in conjunction with the present invention.

In another embodiment, any support sheet that is used in connection with the present invention is formed from a composition that is water soluble. In this embodiment, after formation of flexible ceramic fibers in accordance with the present invention, the resulting ceramic fiber-laden support sheet can be placed in water where the underlying support sheet will dissolve leaving only and/or primarily the network of flexible ceramic fibers.

With regard to an exemplary electrospinning process, the following is one suitable example thereof, however the present invention is not limited to only the following electrospinning process. Rather, other suitable electrospinning process, as known to those of skill in the art, can be employed in conjunction with the present invention.

One exemplary process of the present invention is as follows: Flexible ceramic fibers in accordance with the present invention can be formed from a solution of electrospinnable polymer and a ceramic composition (or precursor). Such a solution is then electrospun (or subjected to NGJ) to produce suitable ceramic-polymer composite fibers. The resulting ceramic-polymer composite fibers are then heated from approximately room temperature to about 700° C. in about 6 hours to yield, for example, $TiO_2$ fibers. It should be noted that the present invention utilizes a process whereby, in one embodiment, the temperature is raised gradually from approximately room temperature to about 700° C. In this example, if the fibers are placed in an oven pre-heated to 700° C. the fibers formed are found to be brittle.

In another embodiment, flexible ceramic fibers in accordance with the present invention can be produced by forming a solution of electrospinnable polymer and a ceramic composition (or precursor). Such a solution is then permitted to age for about one month, or even for about 2 weeks. The resulting solution is then electrospun or subjected to NGJ to yield the desired ceramic-polymer composite fibers. These ceramic-polymer composite fibers can then be subjected to a rapid heating step (including a heating step where the oven is pre-heated to the desired temperature), or a gradual heating step to yield flexible ceramic fibers in accordance with the present invention. While not wishing to be bound to any one theory, it is believed that permitting the solution of the electrospinnable polymer and a ceramic composition (or precursor) to age permits the ceramic fiber-forming compounds contained therein to partially react before electrospinning (or NGJ), thereby permitting the use of rapid heating steps without sacrificing flexibility.

One such exemplary ceramic fiber forming receipt within the scope of the present invention includes a polymer solution of 3 grams polyvinylpyrrolidone (molecular weight: 1,300,000, available from Aldrich) in 50 ml ethanol, which is allowed to sit for 1 day to dissolve the polymer. Next, Tyzor TPT (tetraisopropyl titanate, available from Dupont) is mixed into the polymer solution in a mass proportion of 2 parts Tetraisopropyl Titanate to 5 parts of the prepared polymer solution. The mixture can be electrospun immediately followed by slow heating, or the mixture can be aged, then electrospun, followed by either gradual or rapid heating. After heating to 700° C. the rutile form of $TiO_2$ is formed generating fibers having diameters of about 700 nm. Magnesium oxide-based fibers can also be made from the above process by substituting the tetraisopropyl titanate with magnesium acetate.

In another embodiment of the present invention long thin flexible fibers are made according the following process. A polymer solution (polyvinylpyrrolidone solution) is prepared by mixing 3 grams of polyvinylpyrrolidone (molecular weight: 1,300,000, available from Aldrich) with 50 ml of absolute ethanol (available from Pharmco). This solution is then left for one day without stirring in order to form homogeneous solution.

Next ten grams of the above polymer solution is mixed with different amounts of tetraisopropyl titanate (commercially available from Du Pont as Tyzor TPT Titanate): 4 grams, 4.8 grams, 5.35 grams and 10 grams. The bottle containing the above polymer solution is, in one embodiment, placed in an ice container while mixing in the tetraisopropyl titanate. Cloudiness occurs almost immediately after mixing in the tetraisopropyl titanate. After about 30 minutes the cloudiness disappears leaving a clear, or nearly clear, solution. This solution is left in the ice for an additional 3 hours and then taken out of the ice container and kept in a cabinet for storage. The resulting solution is then aged for two weeks. On 15th day some of the aged solution is taken from the bottle and transferred into a small bottle. The solution should be transferred into a small bottle because the solution tends to turn into a thick white solution upon exposure to air, thereby resulting in a solution that can not be electrospun. Accordingly, following the above procedure reduces the amount of wasted solution. The solution in the small bottle is then drawn into two syringes. The remaining solution in the main bottle is stored for future usage. The solution in the syringes are supplied to an electrospinning device at constant flow rate in the range of about 10 to about 30 µL/min. In this embodiment, the diameter of the titanium dioxide nanofibers produced depends on the flow rate of the electrospinning solution. The voltage applied is 20 KV, the gap distance is approximately 15 cm. The same procedure and operating conditions are used for all the different concentration amounts of tetraisopropyl titanate in solution. No difficulty in electrospinning any of the above solutions is observed, regardless of the tetraisopropyl titanate content in solution.

Generally speaking, 10 ml of polymer solution produces about 0.5 grams of nanofibers. The resultant fibers are heated to 700° C. slowly (starting at room temperature and raising the temperature to 700° C. at the rate of about 20° C./minute) and then left at 700° C. for 2 hours. Heating degrades the polymer, thereby resulting in the conversion of the composite fibers into $TiO_2$ ceramic fibers. The resulting fibers are highly flexible and can be handled easily even after heating to 700° C. Some of, the fibers are heated to 700° C. rapidly by subjecting the composite fibers to a pre-heated 700° C. oven. The resulting fibers from the rapid heating process are found to also be flexible.

Table 1 Summary of the quality of the electrospun titania nanofibers after heating to 700° C.

TABLE 1

|  | Aged Solution | Un-Aged Solution |
| --- | --- | --- |
| Slow Heating to 700° C. | Flexible | Flexible |
| Rapid Heating to 700° C. | Flexible | Brittle |

From the above observations, one can conclude that the aged solution nanofibers are always flexible irrespective of whether a slow or rapid heating step is used to produce such fibers. Also, as can be seen above, aging the electrospinnable solution does impart the ability to rapid heat the resulting composite fibers in order to yield the desired ceramic fibers. This is confirmed by the fact that rapid heating of composite fibers formed from the un-aged solution yields brittle ceramic fibers.

Electrospun nanofibers are weighed before heating and after heating to 700° C. After heating to 700° C., the weight of the nanofibers is reduced and the reduction is attributed to the degradation of the polymer portion of the composite fibers. Calculations are performed in order to study the affect of different amounts of tetraisopropyl titanate in an electrospinnable polymer solution. The weight and percentage of the titania nanofibers retained when different amounts of tetraisopropyl titanate is used is shown in Tables 2 and 3.

Table 2 documents the weight of the composite nanofibers before heating and the weight of the resulting ceramic nanofibers after heating, when different amounts of tetraisopropyl titanate is added to the spinnable polymer solution.

TABLE 2

| Amount of Tetraisopropyl Titanate in Grams per 10 Grams of PVP Solution | Weight in Grams of the Nanofibers Prior to Heating (Right After Electrospinning) | Weight in Grams of the Nanofibers After Heating to 700° C., With a 2 Hour Hold Time |
| --- | --- | --- |
| 4 | 0.5715 | 0.2512 |
| 4 | 0.4987 | 0.2076 |
| 4.8 | 0.7873 | 0.3642 |
| 4.8 | 1.0073 | 0.4997 |
| 5.35 | 1.966 | 0.9509 |
| 5.35 | 0.7476 | 0.3383 |
| 10 | 0.2735 | 0.1564 |

TABLE 3

| Amount of Tetraisopropyl Titanate in Grams per 10 Grams of PVP Solution | Percentage of Age Loss of Polymer in the Nanofibers After Heating to/at 700° C. | Percentage of Nanofibers Retained After Heating to/at 700° C. |
| --- | --- | --- |
| 4 | 57 | 43 |
| 4.8 | 52 | 48 |
| 5.35 | 53.5 | 46.5 |
| 10.0 | 43 | 57 |

Figure 1B:
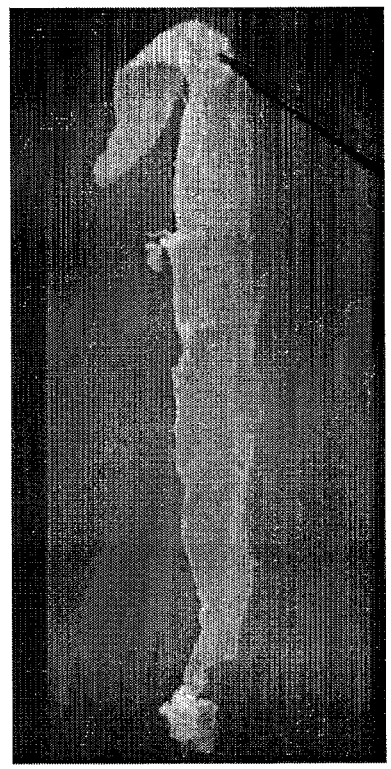
FIG. 1(B) is a close-up photograph of a sheet titanium dioxide nanofibers, formed in accordance with one embodiment of the present invention, after having been heated to 700° C.
Figure 2A:
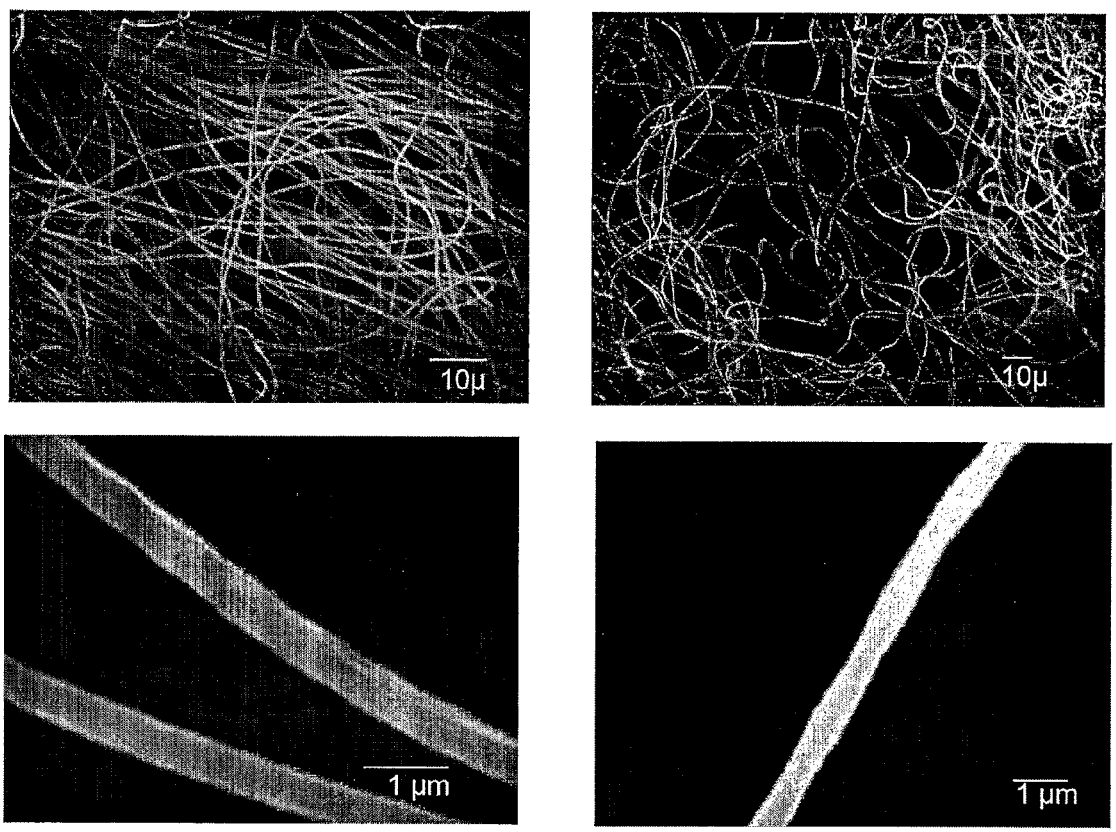
FIG. 2(A) is a series of SEM photographs of electrospun titanium dioxide fibers, formed in accordance with one embodiment of the present invention, after having been heated to 700° C.
Figure 2B:
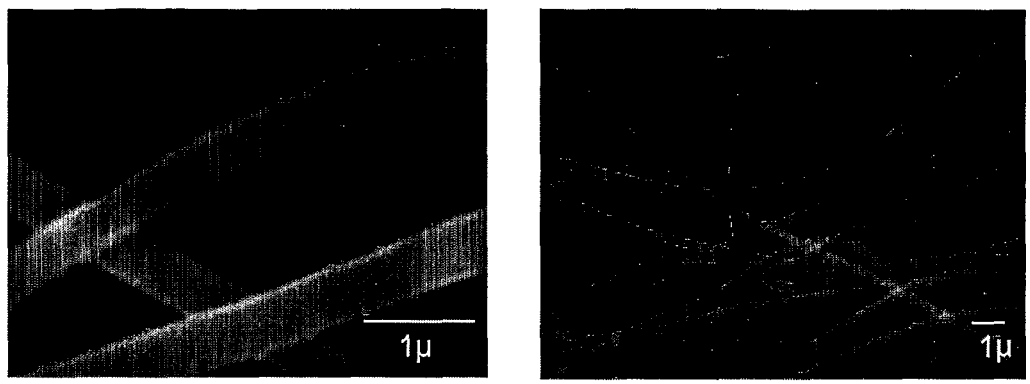
FIG. 2(B) is a series of SEM photograph of electrospun titanium dioxide fibers, formed in accordance with another embodiment of the present invention, after heaving been heated to 700° C.

Scanning Electron Microscopy (SEM) images are used to measure the diameter of the fibers. The average diameter of the fibers is approximately 700 nm when 4 grams of tetraisopropyl titanate is mixed with 10 grams of polymer solution and then spun at the rate of about 10 µL/min. In another embodiment, the average diameter of the fibers is approximately and 400 nm when spun at the rate of about 30 µL/min. The size distribution of the fibers is fairly narrow. The surface of the fibers is smooth without any irregularities. In this regard the photographs of FIGS. 1 and 2 illustrate exemplary fibers made in accordance with various embodiments of the present invention.

Figure 3:
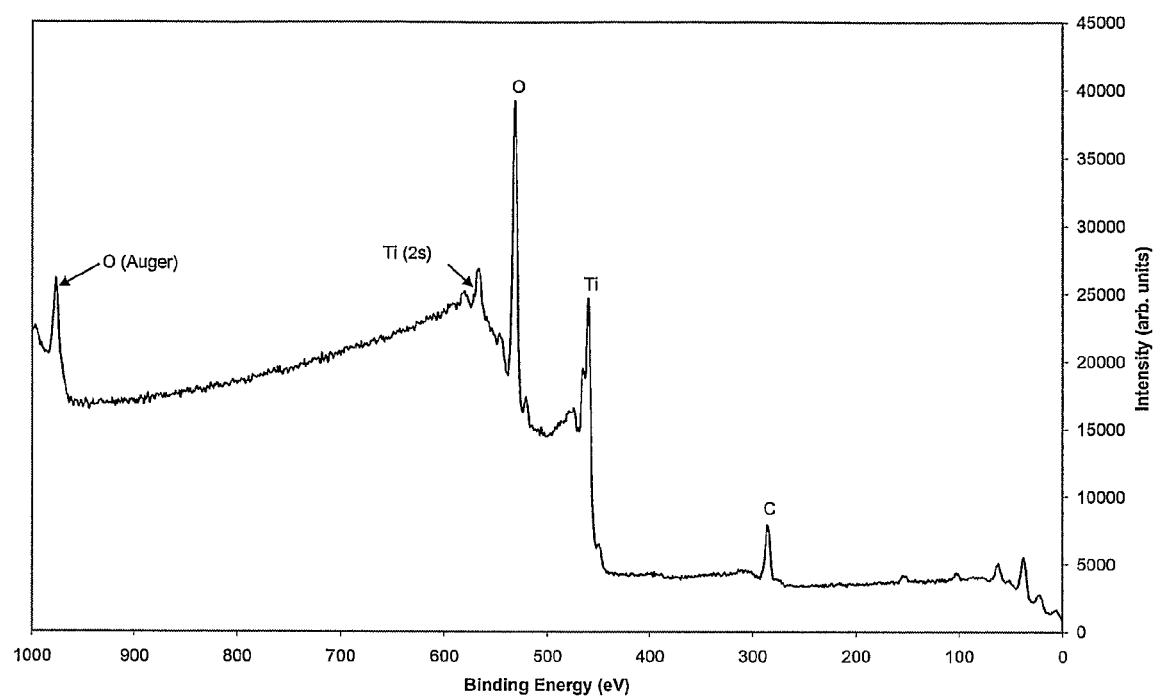
FIG. 3 is a plot of binding energy versus intensity for electrospun titanium dioxide fibers, formed in accordance with one embodiment of the present invention, after having been heated to 700° C.
Figure 4:
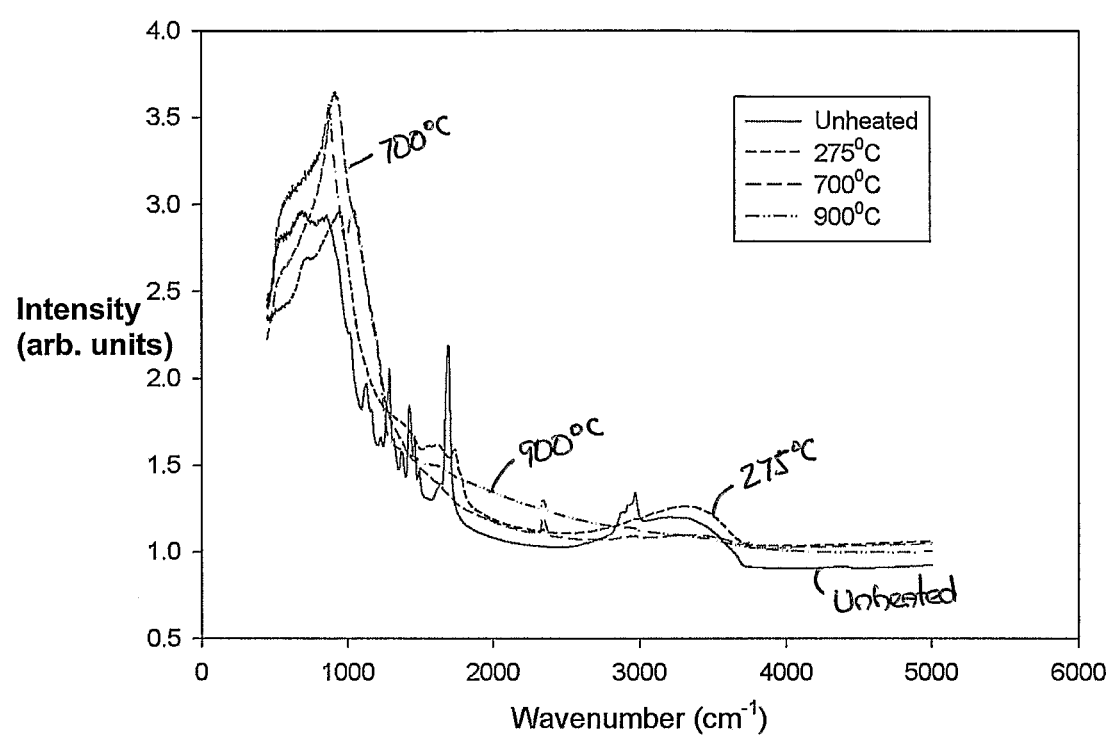
FIG. 4 is a graph illustrating various infrared spectra for electrospun titanium dioxide nanofibers, formed in accordance with various embodiments of the present invention, where the fibers are either unheated, or heated a 275° C., 700° C. or 900° C.

X-ray Photoelectron Spectroscopy (XPS) and InfraRed Spectrum are used to identify the elements in the fibers. In FIG. 3, the peak around 285 shows carbon retained in the fibers even after the fibers are heated to a high temperature (e.g., 700° C.). The peaks around 980 and 550 correspond to oxygen. While the peaks around 460 and 560 correspond to titanium. Since the nanofibers are heated to, in one instance, 700° C., $TiO_2$ is in the rutile phase. From the XPS it can be concluded that a large portion of the fibers consist of $TiO_2$. Whereas only a small amount of carbon is still retained in the fibers after the fibers are subjected to heating. FIG. 4 is the infrared spectra of titania nanofibers heated at different temperatures. As can be seen from FIG. 4, the titanium dioxide peak at approximately 1000 $cm^{-1}$ strengthens as the heating temperature is increased, whereas the remaining constituents, including carbon, are reduced as the heating temperature is increased (i.e., the height of the remaining are reduced and/or significantly less pronounced).

Alternatively, as is discussed above, fibers in accordance with the present invention can be formed by an NGJ process. One such exemplary process is described below. However, it should be noted that the present invention is not limited to solely this NGJ process, other suitable NGJ process could also be employed to produce the fibers disclosed herein.

A nozzle 10 that is employed in practicing an NGJ process that can be used to produce flexible ceramic fibers in accordance with the present invention is best described with reference to FIG. 5. Nozzle 10 includes a center tube 11 having an entrance orifice 26 and an outlet orifice 15. The diameter of center tube 11 can vary based upon the need for gas flow, which impacts the velocity of the gas as it moves a film of liquid across the jet space 14, as will be described below. In one embodiment, the diameter of tube 11 is from about 0.5 to about 10 mm, or even from about 1 to about 2 mm. Likewise, the length of tube 11 can vary depending upon construction conveniences, heat flow considerations, and shear flow in the fluid. In one embodiment, the length of tube 11 will be from about 1 to about 20 cm, or even from about 2 to about 5 cm. Positioned concentrically around and apart from the center tube 11 is a supply tube 12, which has an entrance orifice 27 and an outlet orifice 16. Center tube 11 and supply tube 12 create an annular space or column 13. This annular space or column 13 has a width, which is the difference between the inner and outer diameter of the annulus, that can vary based upon the viscosity of the fluid and the maintenance of a suitable thickness of fiber-forming material fluid on the inside wall of gas jet space 14. In one embodiment, the width is from about 0.05 to about 5 mm, or even from about 0.1 to about 1 mm. Center tube 11 is vertically positioned within supply tube 12 so that a gas jet space 14 is created between lower end 24 of center tube 11 and lower end 23 of supply tube 12. The position of center tube 11 is adjustable relative to lower end 23 of supply tube 12 so that the length of gas jet space 14 is adjustable. Gas jet space 14, i.e., the distance between lower end 23 and lower end 24, is adjustable so as to achieve a controlled flow of fluid along the inside of tube 12, and optimal conditions for nanofiber production at the end 23 of tube 12. In one embodiment, this distance is from about 0.1 to about 10 mm, or even from about 1 to about 2 mm. It should be understood that gravity will not impact the operation of the apparatus of this invention, but for purposes of explaining the present invention, reference will be made to the apparatus as it is vertically positioned as shown in the Figures.

It should be appreciated that the supply tube outlet orifice 16 and gas jet space 14 can have a number of different shapes and patterns. For example, the space 14 can be shaped as a cone, bell, trumpet, or other shapes to influence the uniformity of fibers launched at the orifice. The shape of the outlet orifice 16 can be circular, elliptical, scalloped, corrugated, or fluted. Still further, the inner wall of supply tube 12 can include slits or other manipulations that may alter fiber formation. These shapes influence the production rate and the distribution of fiber diameters in various ways.

Figure 5:
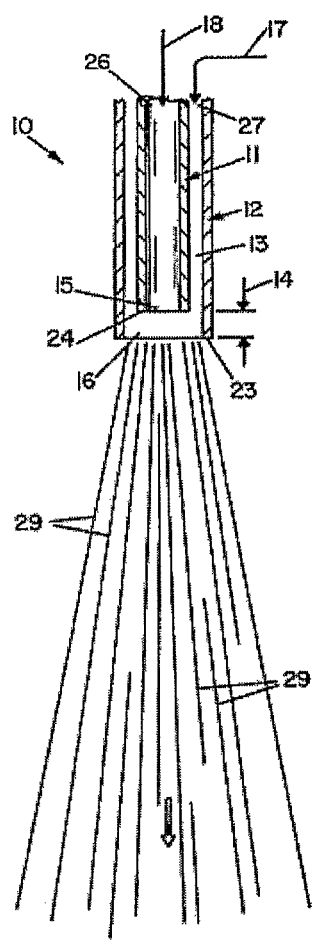
FIG. 5 is a schematic diagram of an apparatus for producing flexible ceramic nanofibers according to this invention.

According to the present invention, nanofibers are produced by using the apparatus of FIG. 5 by the following method. Fiber-forming material that includes therein the necessary ceramic fiber forming components is provided by a source 17, and fed through annular space 13. The fiber-forming material is directed into gas jet space 14. Simultaneously, pressurized gas is forced from a gas source 18 through the center tube 11 and into the gas jet space 14.

Within gas jet space 14 it is believed that the fiber-forming material is in the form of an annular film. In other words, fiber-forming material exiting from the annular space 13 into the gas jet space 14 forms a thin layer of fiber-forming material on the inside wall of supply tube 12 within gas jet space 14. This layer of fiber-forming material is subjected to shearing deformation by the gas jet exiting from center tube outlet orifice 15 until it reaches the fiber-forming material supply tube outlet orifice 16. At this point, it is believed that the layer of fiber-forming material is blown apart into many small strands 29 by the expanding gas and ejected from orifice 16 as shown in FIG. 5. Once ejected from orifice 16, these strands solidify and form nanofibers. This solidification can occur by cooling, chemical reaction, coalescence, ionizing radiation or removal of solvent.

As noted above, the fibers produced according to this process are nanofibers and have an average diameter that is less than about 3,000 nanometers, or from about 3 to about 1,000 nanometers, or even from about 10 to about 500 nanometers. The diameter of these fibers can be adjusted by controlling various conditions including, but not limited to, temperature and gas pressure. The length of these fibers can widely vary to include fibers that are as short as about 0.01 mm up to those fibers that are about many km in length. Within this range, the fibers can have a length from about 1 mm to about 1 km, and more narrowly from about 1 cm to about 1 mm. The length of these fibers can be adjusted by controlling the solidification rate.

As discussed above, pressurized gas is forced through center tube 11 and into jet space 14. This gas should be forced through center tube 11 at a sufficiently high pressure so as to carry the fiber forming material along the wall of jet space 14 and create nanofibers. Therefore, in one embodiment, the gas is forced through center tube 11 under a pressure of from about 10 to about 5,000 pounds per square inch (psi), or even from about 50 to about 500 psi.

The term gas as used throughout this specification includes any gas. Non-reactive gases are preferred. Such a term refers to those gases, or combinations thereof, that will not deleteriously impact the fiber-forming material. Examples of these gases include, but are not limited to, nitrogen, helium, argon, air, carbon dioxide, steam fluorocarbons, fluorochlorocarbons, and mixtures thereof. It should be understood that for purposes of this specification, gases will also refer to those super heated liquids that evaporate at the nozzle when pressure is released, e.g., steam. It should further be appreciated that these gases may contain solvent vapors that serve to control the rate of drying of the nanofibers made from polymer solutions. Still further, useful gases include those that react in a desirable way, including mixtures of gases and vapors or other materials that react in a desirable way. For example, it may be useful to employ gas streams that include molecules that serve to crosslink polymers. Still further, it may be useful to employ gas streams that include metals that serve to improve the production of the ceramics fibers.

Figure 6:
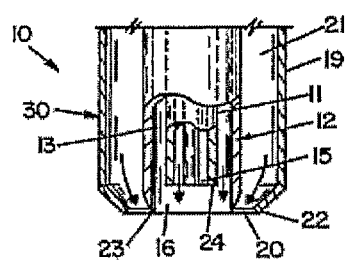
FIG. 6 is a schematic representation of one embodiment of an apparatus that can be used to produce ceramic nanofibers in accordance with the present invention, wherein the apparatus includes a lip cleaner assembly.
Figure 7:
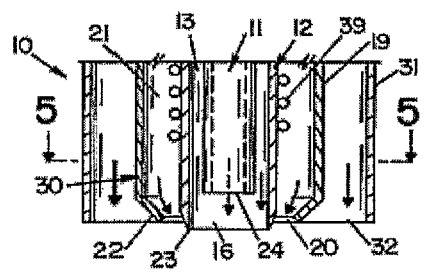
FIG. 7 is a schematic representation of one embodiment of an apparatus that can be used to produce ceramic nanofibers in accordance with the present invention, wherein the apparatus includes an outer gas shroud assembly.

In another embodiment, as is shown in FIG. 6, nozzle 10 further comprises a lip cleaner 30. Within this assembly, an outer gas tube 19 is positioned concentrically around and apart from supply tube 12. Outer gas tube 19 extends along supply tube 12 and thereby creates a gas annular column 21. Lower end 22 of outer gas tube 19 and lower end 23 of supply tube 12 form lip cleaner orifice 20. In one embodiment, lower end 22 and lower end 23 are on the same horizontal plane (flush) as shown in FIG. 6. In another embodiment, however, lower ends 22 and 23 may be on different horizontal planes as shown in FIGS. 7 and 8. As also shown in FIG. 6, outer gas tube 19 preferably tapers and thereby reduces the size of annular space 21. Pressurized gas is forced through outer gas tube 19 and exits from outer gas tube 19 at lip cleaner orifice 20, thereby preventing the build up of residual amounts of fiber-forming material that can accumulate at lower end 23 of supply tube 12. The gas that is forced through gas annular column 21 should be at a sufficiently high pressure so as to prevent accumulation of excess fiber-forming material at lower end 23 of supply tube 12, yet should not be so high that it disrupts the formation of fibers. Therefore, in one embodiment, the gas is forced through the gas annular column 21 under a pressure of from about 0 to about 1,000 psi, or even from about 10 to about 100 psi. The gas flow through lip cleaner orifice 20 also affects the exit angle of the strands of fiber-forming material exiting from outlet orifice 15, and therefore lip cleaner 30 of this environment serves both to clean the lip and control the flow of exiting fiber strands.

Figure 9:
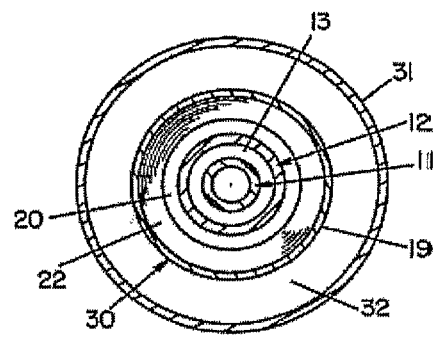
FIG. 9 is a cross sectional view taken along line 5-5 of the embodiment shown in FIG. 7.

In yet another embodiment, which is shown in FIGS. 7, 8 and 9, a shroud gas tube 31 is positioned concentrically around outer gas tube 19. Pressurized gas at a controlled temperature is forced through shroud gas tube 31 so that it exits from the shroud gas tube orifice 32 and thereby creates a moving shroud of gas around the nanofibers. This shroud of gas controls the cooling rate, solvent evaporation rate of the fluid, or the rate chemical reactions occurring within the fluid. It should be understood that the general shape of the gas shroud is controlled by the width of the annular tube orifice 32 and its vertical position with respect to bottom 23 of tube 12. The shape is further controlled by the pressure and volume of gas flowing through the shroud. It should be further understood that the gas flowing through the shroud is preferably under a relatively low pressure and at a relatively high volume flow rate in comparison with the gas flowing through center tube 11.

In one embodiment, shroud gas tube orifice 32 is in an open configuration, as shown in FIG. 7. In another embodiment, as shown in FIG. 8, orifice 32 is in a constricted configuration, wherein the orifice is partially closed by a shroud partition 33 that adjustably extends from shroud gas tube 31 toward lower end 23.

Figure 10:
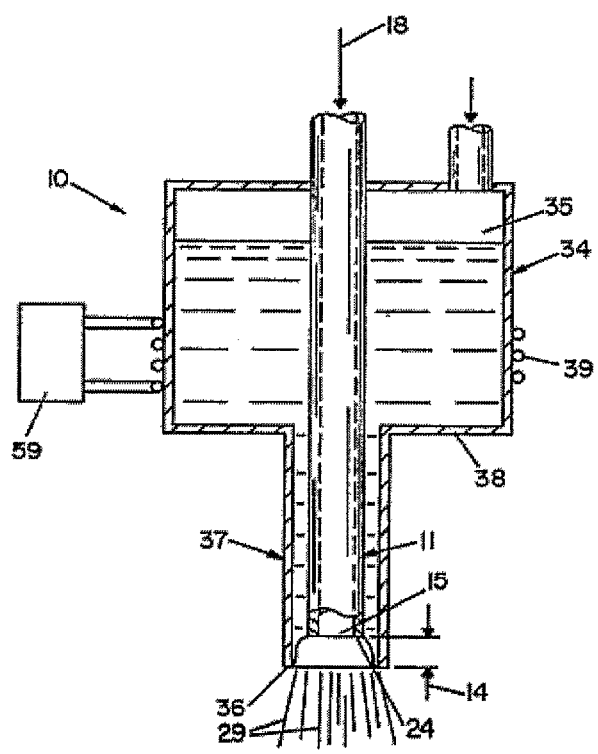
FIG. 10 is a schematic representation of one embodiment of an apparatus that can be used to produce ceramic nanofibers in accordance with the present invention, wherein the apparatus is designed for batch processes.

In practicing the present invention, a spinnable fluid or fiber-forming material can be delivered to annular space 13 by several techniques. For example, and as shown in FIG. 10, the fiber-forming material can be stored within nozzle 10. This is especially useful for batch operations. As with the previous embodiments, nozzle 10 will include a center tube 11. Positioned, preferably concentrically, around center tube 11 is a fiber-forming material container 34, comprising container walls 38, and defining a storage space 35. The size of storage space 35, and therefore the volume of spinnable fluid stored within it, will vary according to the particular application to which the present invention is put. Fiber-forming material container 34 further comprises a supply tube 12. Center tube 11 is inserted into fiber-forming material container 34 in such a way that a center tube outlet orifice 15 is positioned within the outlet tube 37, creating a gas jet space 14 between the lower end 24 of center outlet 11 and the lower end 36 of outlet tube 37. The position of center tube 11 is vertically adjustable relative to lower end 36 so that the length of the gas jet space 14 is likewise adjustable. As with previously described embodiments, gas jet space 14, i.e., the distance between lower end 36 and lower end 24, is adjustable so as to achieve a uniform film within space 14 and thereby produce uniform fibers with small diameters and high productivity. In one embodiment, this distance is from about 1 to about 2 mm, or even from about 0.1 to about 5 mm. The length of outlet tube 37 can be varied according to the particular application of the present invention. If container wall 38 is of sufficient thickness, such that a suitable gas jet space can be created within wall 38, then outlet tube 37 may be eliminated.

According to this embodiment, nanofibers are produced by using the apparatus of FIG. 10 according to the following method. Pressure is applied to the container so that fiber-forming material is forced from storage space 35 into gas jet space 14. The pressure that is applied can result from gas pressure, pressurized fluid, or molten polymer from an extruder. Simultaneously, pressurized gas is forced from a gas source 18, through center tube 11, and exits through center tube orifice 15 into gas jet space 14. As with previous embodiments, heat may be applied to the fiber-forming material prior to or after being placed in fiber-forming material container 34, to the pressurized gas entering center tube 11, and/or to storage space 35 by heat source 39 or additional heat sources. Fiber-forming material exiting from storage space 35 into gas jet space 14 forms a thin layer of fiber-forming material on the inside wall of gas jet space 14. This layer of fiber-forming material is subjected to shearing deformation, or other modes of deformation such as surface wave, by the gas jet until it reaches container outlet orifice 36. There the layer of fiber-forming material is blown apart, into many small strands, by the expanding gas.

Figure 11:
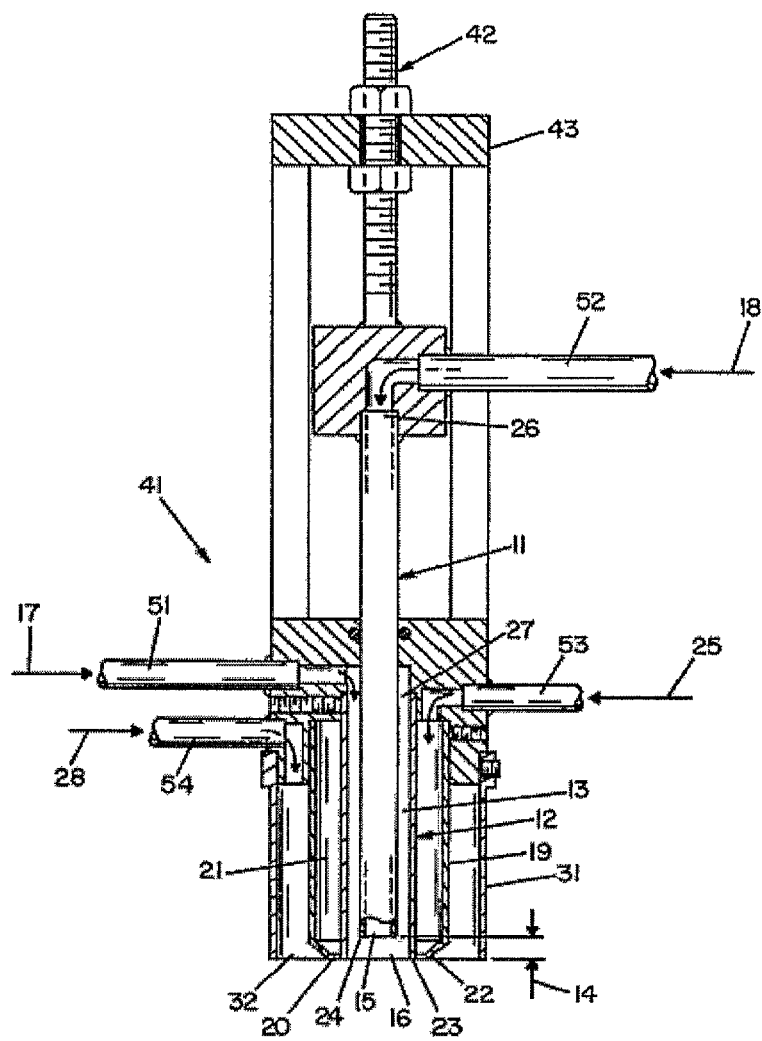
FIG. 11 is a schematic representation of one embodiment of an apparatus that can be used to produce ceramic nanofibers in accordance with the present invention, wherein the apparatus is designed for continuous processes.

In still another embodiment, as shown in FIG. 11, the fiber-forming material can be delivered on a continuous basis rather than a batch basis as in FIG. 10. In this embodiment, the apparatus is a continuous flow nozzle 41. Consistent with previous embodiments, nozzle 41 comprises a center tube 11, a supply tube 12, an outer gas tube 19, and a gas shroud tube 31. Supply tube 12 is positioned concentrically around center tube 11. Outer gas tube 19 is positioned concentrically around supply tube 12. Gas shroud tube 31 is positioned concentrically around outer gas tube 19. Center tube 11 has an entrance orifice 26 and an outlet orifice 15. As in previous embodiments, the diameter of center tube 11 can vary. In one embodiment, the diameter of tube 11 is from about 1 to about 20 mm, or even from about 2 to about 5 mm. Likewise the length of tube 11 can vary. In one embodiment, the length of tube 11 will be from about 1 to about 10 cm, or even from about 2 to about 3 cm.

Positioned concentrically around the center tube 11 is a supply tube 12 that has an entrance orifice 27 and an outlet orifice 16. The center tube 11 and supply tube 12 create an annular space or column 13. This annular space or column 13 has a width, that can vary, which is the difference between the inner and outer diameter of the annulus. In a one embodiment, the width is from about 0.05 to about 5 mm, or even from about 0.1 to about 1 mm.

Center tube 11 is vertically positioned within the supply tube 12 so that a gas jet space 14 is created between the lower end 24 of center tube 11 and the lower end 23 of supply tube 12. The position of center tube 11 is adjustable relative to supply tube outlet orifice 16 so that the size of gas jet space 14 is adjustable. As with previously embodiments, the gas jet space 14, i.e., the distance between lower end 23 and lower end 24, is adjustable. In one embodiment this distance is from about 0.1 to about 10 mm, or even from about 1 to about 2 mm.

Center tube 11 is attached to an adjustment device 42 that can be manipulated such as by mechanical manipulation. In one particular embodiment as shown in FIG. 11, the adjustment device 42 is a threaded rod that is inserted through a mounting device 43 and is secured thereby by a pair of nuts threaded onto the rod.

In this embodiment, supply tube 12 is in fluid tight communication with supply inlet tube 51. Center tube 11 is in fluid tight communication with pressurized gas inlet tube 52, outer gas tube 19 is in fluid tight communication with the lip cleaner gas inlet tube 53, and gas shroud tube 31 is in fluid tight communication with shroud gas inlet tube 54. This fluid tight communication is achieved by use of a connector, but other means of making a fluid tight communication can be used, as known by those skilled in the art.

According to the present invention, nanofibers are produced by using the apparatus of FIG. 11 by the following method. Fiber-forming material is provided by a source 17 through supply inlet tube 51 into and through annular space 13, and then into gas jet space 14. In one embodiment, the fiber-forming material is supplied to the supply inlet tube 51 under a pressure of from about 0 to about 15,000 psi, or even from about 100 to about 1,000 psi. Simultaneously, pressurized gas is forced through inlet tube 52, through center tube 11, and into gas jet space 14. As with previously described embodiments, it is believed that fiber-forming material is in the form of an annular film within gas jet space 14. This layer of fiber-forming material is subjected to shearing deformation by the gas jet exiting from the center tube outlet orifice 15 until it reaches the fiber-forming material supply tube outlet orifice 16. At this point, it is believed that the layer of fiber-forming material is blown apart into many small strands by the expanding gas. Once ejected from orifice 16, these strands solidify in the form of nanofibers. This solidification can occur by cooling, chemical reaction, coalescence, ionizing radiation or removal of solvent. As with previously described embodiments also simultaneously, pressurized gas is supplied by gas source 25 to lip cleaner inlet tube 53 into outer gas tube 19.

As with previous embodiments, the outer gas tube 19 extends along supply tube 12 and thereby creates an annular column of gas 21. The lower end 22 of gas annular column 21 and the lower end 23 of supply tube 12 form a lip cleaner orifice 20. In this embodiment, lower end 22 and lower end 23 are on the same horizontal plane (flush) a shown in FIG. 11. As noted above, however, lower ends 22 and 23 may be on different horizontal planes. The pressurized of gas exiting through lip cleaner orifice 20 prevents the buildup of residual amounts of fiber-forming material that can accumulate at lower end 23 of supply tube 12. Simultaneously, pressurized gas is supplied by gas source 28 through shroud gas inlet tube 54 to shroud gas tube 31. Pressurized gas is forced through the shroud gas tube 31 and it exits from the shroud gas tube orifice 32 thereby creating a shroud of gas around the nanofibers that control the cooling rate of the nanofibers exiting from tube orifice 16. In one particular embodiment, fiber-forming material is supplied by an extruder.

Figure 12:
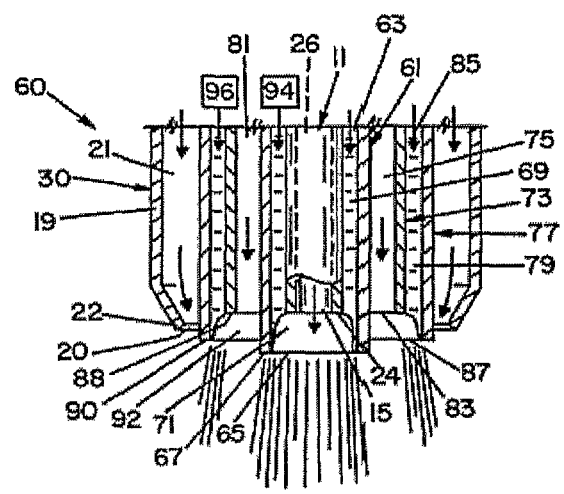
FIG. 12 is a schematic representation of one embodiment of an apparatus that can be used to produce ceramic nanofibers in accordance with the present invention, wherein the apparatus is designed for the production of a mixture of nanofibers from one or more polymers simultaneously.
Figure 13:
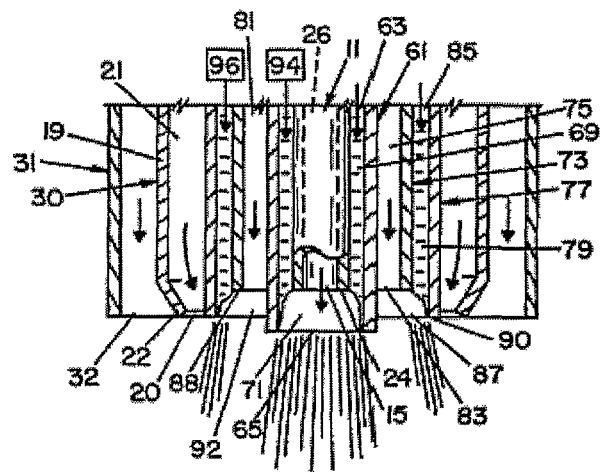
FIG. 13 is a schematic representation of one embodiment of an apparatus that can be used to produce ceramic nanofibers in accordance with the present invention, wherein the apparatus includes an outer gas shroud assembly.
Figure 14:
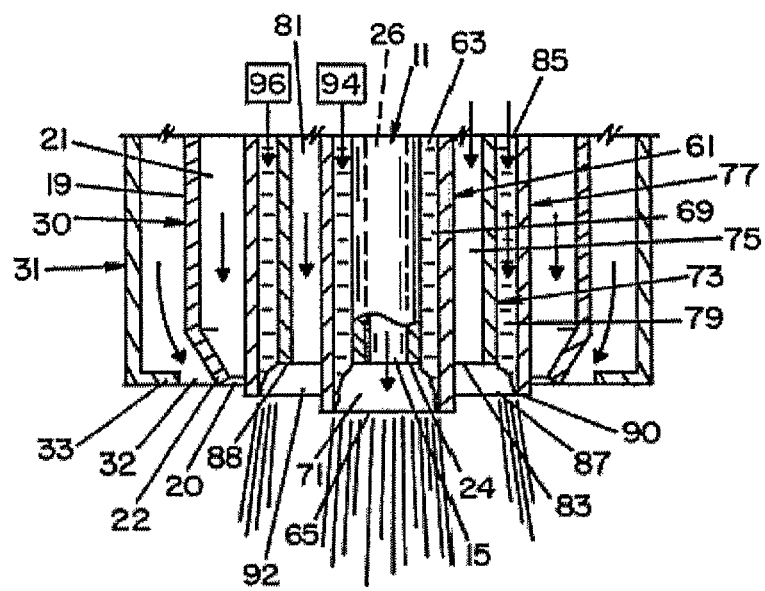
FIG. 14 is a schematic representation of another embodiment of an apparatus that can be used to produce ceramic nanofibers in accordance with the present invention, wherein the apparatus includes an outer gas shroud, having a partition directed radially inward at an end thereof.

A mixture of nanofibers can be produced from the nozzles shown in FIG. 12 through 14. In these embodiments, a plurality of gas tubes and supply tubes are concentrically positioned in an alternating manner such that a plurality of gas jet spaces are created. In previously described embodiments, a single supply tube and a single gas tube create a single gas jet space.

As shown in FIG. 12, nozzle 60 includes a center tube 11 having an entrance orifice 26 and an outlet orifice 15. The diameter of center tube 11 can vary based upon the need for gas flow. Center tube 11 may be specifically adapted to carry a pressurized gas. Positioned concentrically around center tube 11 is a first supply tube 61 that has an entrance orifice 63 and an exit orifice 65. Center tube 11 and first supply tube 61 create a first supply annular space or column 69. First supply tube 61 may be specifically adapted to carry a fiber-forming material. Furthermore, center tube 11 and first supply tube 61 may be positioned such that they are essentially parallel to each other.

As with previous embodiments, center tube 11 is positioned within first supply tube 61 so that a first gas jet space 71 is created between the lower end 24 of center tube 11 and the lower end 67 of first supply tube 61. The position of center tube 11 may be adjustable relative to lower end 67 of first supply tube 61 so that the length of first gas jet space 71 is adjustable. Also, the width of first supply annular space or column 69 can be varied to accommodate the viscosity of the fluid and the maintenance of a suitable thickness of fiber-forming material on the inside wall of first gas jet space 71.

Nozzle 60 also has a middle gas tube 73 positioned concentrically around and apart from first supply tube 61. Middle gas tube 73 extends along first supply tube 61 and thereby creates a middle gas annular column 75. Middle gas tube 73 has an entrance orifice 81 and an exit orifice 83.

Unlike previous embodiments, a second supply tube 77 is positioned concentrically around middle gas tube 73, which creates a second supply annular space or column 79. Second supply tube 77 has an entrance orifice 85 and an exit orifice 87. As with first supply tube 61, second supply tube 77 may be specifically adapted to carry a fiber forming material. Middle gas tube 73 is positioned within second supply tube 77 so that a second gas jet space 92 is created between the lower end 88 of middle gas tube 73 and the lower end 90 of second supply tube 77. The position of middle gas tube 73 may be adjustable relative to lower end 90 of second supply tube 77 so that the length of second gas jet space 92 is adjustable. The dimensions of first and second gas jet spaces, 71 and 92 respectively, are adjustable in order to achieve a controlled flow of fiber-forming material along the inside of first supply tube 61 and second supply tube 77, and thereby provide optimal conditions for nanofiber production at ends 67 and 90 of tubes 61 and 77. In one embodiment, the distance between ends 88 and 90, and between ends 24 and 67, is from about 0.1 to about 10 mm, or even from about 1 to about 2 mm. In one example of this embodiment, lower end 90 and lower end 67 are on different horizontal planes as shown in FIG. 12. In another example of this embodiment, lower end 90 is on the same horizontal plane (flush) as lower end 67 (not shown).

For purposes of clarity, the present embodiments as shown in FIGS. 12 through 14 feature two supply tubes and corresponding gas supply tubes, but it is envisioned that any multiple of supply tubes and gas tubes can be positioned concentrically around center tube 11 in the same repeating pattern as described above.

Nozzle 60 optionally further comprises a lip cleaner 30, as shown in FIG. 12. Lip cleaner 30 comprises an outer air tube 19 positioned concentrically around and apart from second supply tube 77, as shown in FIG. 12, or concentrically around the outermost supply tube if more than two supply tubes are present as mentioned above. Outer gas tube 19 extends along second supply tube 77 and thereby creates a gas annular column 21. A lower end 22 of outer gas tube 19 and lower end 90 of second supply tube 77 form lip cleaner orifice 20. As in previous embodiments, lower ends 22 and 90 may also be on different horizontal planes as shown in FIG. 12, or lower end 22 may be on the same horizontal plane (flush) as lower end 90 as shown in FIG. 13. As shown in FIGS. 12 through 14, outer gas tube 19 preferably tapers and thereby reduces the size of annular space 21 at lower end 22.

Nanofibers are produced by using the apparatus of FIG. 12 by the following method. A first fiber-forming material is provided by a first material source 94, and fed through first annular space 69 and directed into first gas jet space 71. Pressurized gas is forced from a gas source through the center tube 11 and into first gas jet space 71. This gas should be forced through center tube 11 at a sufficiently high pressure so as to carry the fiber forming material along the wall of jet space 71 and create nanofibers, as mentioned in previous embodiments. A second fiber-forming material may be provided by the first material source (not shown) or by a second material source 96, and fed through second supply annular space 79. The second fiber-forming material is directed into second gas jet space 92. Pressurized gas is forced from a source through middle gas annular column 75 and into second gas jet space 92. This gas should be forced through middle gas annular column 75 at a sufficiently high pressure so as to carry the fiber forming material along the wall of jet space 92 and create nanofibers, as mentioned in previous embodiments. Therefore, in one embodiment, the gas is forced through center tube 11 and middle gas tube 73 under a pressure of from about 10 to about 5,000 psi, or even from about 50 to about 500 psi.

Pressurized gas is also forced through outer gas tube 19 and exits from outer gas tube 19 at lip cleaner orifice 20, thereby preventing the build up of residual amounts of fiber-forming material that can accumulate at lower end 90 of supply tube 77. The gas flow through lip cleaner orifice 20 also affects the exit angle of the strands of fiber-forming material exiting from exit orifice 87, and therefore lip cleaner 30 of this environment serves both to clean the lip and control the flow of exiting fiber strands. In a similar manner, the gas exiting second supply tube exit orifice 87 also serves to clean lower end 67 of first supply tube 61 and controls the flow of fiber strands exiting from first supply tube 61. In this way, each gas tube functions as a lip cleaner for the supply tube that is concentrically interior to it.

The gas that is forced through gas annular column 21 should be at a sufficiently high pressure so as to prevent accumulation of excess fiber-forming material at lower end 90 of second supply tube 77, yet should not be so high that it disrupts the formation of fibers. Therefore, in one embodiment, the gas is forced through the gas annular column 21 under a pressure of from about 0 to about 1,000 psi, or even from about 10 to about 100 psi. The gas flow through lip cleaner orifice 20 also affects the exit angle of the strands of fiber-forming material exiting from outlet orifice 15, and therefore lip cleaner 30 of this environment serves both to clean the lip and control the flow of exiting fiber strands.

In similar embodiments, which are shown in FIGS. 13 and 14, a shroud gas tube 31 is positioned concentrically around outer gas tube 19. Pressurized gas at a controlled temperature is forced through shroud gas tube 31 so that it exits from the shroud gas tube orifice 32 and thereby creates a moving shroud of gas around the nanofibers. This shroud of gas can control the solidification rate of the fiber-forming material by, for example influencing the cooling rate of a molten fiber-forming material, the solvent evaporation rate of the fiber-forming material, or the rate of chemical reactions occurring within the fiber-forming material. It should be understood that the general shape of the gas shroud is controlled by the width of the annular tube orifice 32 and its vertical position with respect to lower end 22 of outer gas tube 19. The shape is further controlled by the pressure and volume of gas flowing through the shroud. It should be further understood that the gas flowing through the shroud is, in one instance, under a relatively low pressure and at a relatively high volume flow rate in comparison with the gases flowing through center tube 11 and middle gas tube 73.

In one embodiment, shroud gas tube orifice 32 is in an open configuration, as shown in FIG. 13. In another embodiment, as shown in FIG. 14, orifice 32 is in a constricted configuration, wherein the orifice is partially closed by a shroud partition 33 that may adjustably extend radially inward from shroud gas tube 31 toward lower end 23.

It should be understood that there are many conditions and parameters that will impact the formation of fibers, and specifically the ceramic fibers, according to the present invention. For example, the pressure of the gas moving through any of the columns of the apparatus of this invention may need to be manipulated based on the fiber-forming material that is employed. Also, the ceramic fiber-forming material being used or the desired characteristics of the resulting ceramic nanofiber may require that the fiber-forming material itself or the various gas streams be heated. For example, the length of the nanofibers can be adjusted by varying the temperature of the shroud air. Where the shroud air is cooler, thereby causing the strands of fiber-forming material to quickly freeze or solidify, longer nanofibers can be produced. On the other hand, where the shroud air is hotter, and thereby inhibits solidification of the strands of fiber-forming material, the resulting nanofibers will be shorter in length. It should also be appreciated that the temperature of the pressurized gas flowing through center tube 11 and middle gas tube 73 can likewise be manipulated to achieve or assist in these results.

Those skilled in the art will be able to heat the various gas flows using techniques that are conventional in the art. Likewise, the ceramic fiber-forming material can be heated by using techniques well known in the art. For example, heat may be applied to the ceramic fiber-forming material entering the supply tube, to the pressurized gas entering the center tube, or to the supply tube itself by a heat source 39, as shown in FIGS. 7 and 10, for example. In one particular embodiment, as shown in FIG. 10, heat source 39 can include coils that are heated by a source 59.

As would be appreciated upon reading and understanding the process of the present invention, after NGJ production of composite nanofibers is complete, such nanofibers are subjected to a heating step, as is described above, to yield flexible ceramic in accordance with one or more embodiments of the present invention.

In another embodiment, NGJ can be combined with electrospinning techniques. In these combined process, NGJ improves the production rate while the electric field maintains the optimal tension in the jet to produce orientation and avoid the appearance of beads on the fibers. The electric field also provides a way to direct the nanofibers along a desired trajectory through processing machinery, heating ovens, or to a particular position on a collector/sheet. Electrical charge on the fiber can also produce looped and coiled nanofibers that can increase the bulk of the non-woven fabric made from these nanofibers.

Although not wishing to be bound to any one application, flexible ceramic fibers made in accordance with the present invention have a wide variety of possible applications including, but not limited to, filtration media, catalyst application, exhaust gas purification applications, etc.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What is claimed is:

1. A process for making a flexible ceramic composition comprising the steps of:
   (i) mixing at least one sol gel ceramic component, or precursor thereof, with at least one electrospinnable polymer thereby forming an electrospinnable solution;
   (ii) aging the electrospinnable solution for a period of at least 14 days;
   (iii) electrospinning the solution into fibers; and
   (iv) subjecting the fibers to a heating process in a suitable atmosphere so that most and/or all of the carbonaceous component in the fibers oxidizes thereby yielding flexible ceramic fibers,
   wherein the Step (iv) includes subjecting the fibers to a temperature of at least about 700° C.

2. The process of claim 1, wherein the ceramic fibers are formed from one or more of titania, silica, magnesia, zirconia, yttria, alumina, india, zinc oxide, zeolites, natural clays, synthetic clays.

3. The process of claim 1, wherein the ceramic fibers are formed from titanium dioxide.

4. The process of claim 1, wherein the Step (iv) includes subjecting the fibers to a temperature of at least about 900° C.

5. The process of claim 1, wherein the ceramic fibers produced in Step (iv) have an average diameter of from about 0.1 nanometer to about 25,000 nanometers.

6. The process of claim 1, wherein the ceramic fibers produced in Step (iv) have an average diameter of from about 7 nanometers to about 1,000 nanometers.

7. The process of claim 1, wherein the ceramic fibers produced in Step (iv) have an average diameter of about 400 nanometers.

8. The process of claim 1, wherein the ceramic fibers produced in Step (iv) have an average diameter of about 700 nanometers.

9. A flexible ceramic fiber formed in accordance with the process of claim 1.

10. A flexible ceramic fiber fabric formed from fibers formed in accordance with the process of claim 1.

\* \* \* \* \*